(12) United States Patent
Durner et al.

(10) Patent No.: US 7,786,424 B2
(45) Date of Patent: *Aug. 31, 2010

(54) ELECTRONIC DAY AND NIGHT VISION GOGGLES HAVING DUAL CAMERA

(76) Inventors: Andreas Durner, Baumenhelmer Strasse 28, Donauworth (DE) 86609; Andre R Draheim, Krautengartenweg 1, Donauworth (DE) 86609

( * ) Notice: Subject to any disclaimer, the term of this patent is extended or adjusted under 35 U.S.C. 154(b) by 211 days.

This patent is subject to a terminal disclaimer.

(21) Appl. No.: 11/916,004

(22) PCT Filed: May 26, 2006

(86) PCT No.: PCT/EP2006/005069
§ 371 (c)(1),
(2), (4) Date: Jan. 7, 2008

(87) PCT Pub. No.: WO2006/128648
PCT Pub. Date: Dec. 7, 2006

(65) Prior Publication Data
US 2008/0266669 A1 Oct. 30, 2008

(30) Foreign Application Priority Data
May 30, 2005 (DE) .................. 10 2005 024 675

(51) Int. Cl.
*H01J 40/14* (2006.01)
(52) U.S. Cl. .............................. 250/214 VT; 250/208.1
(58) Field of Classification Search ........... 250/214 VT, 250/208.1, 214.1, 331–334, 338.1–338.3; 313/523–532; 345/7–9
See application file for complete search history.

(56) References Cited

U.S. PATENT DOCUMENTS

| 5,106,179 A | 4/1992 | Kamaya |
| 5,200,827 A | 4/1993 | Hanson et al. |

(Continued)

FOREIGN PATENT DOCUMENTS

DE 3806940 A 10/1988

(Continued)

OTHER PUBLICATIONS

PCT/EP2006/005069 ISR, Mar. 6, 2007, Durner.

(Continued)

*Primary Examiner*—Que T Le
(74) *Attorney, Agent, or Firm*—Woodling, Krost and Rust

(57) ABSTRACT

Electronic spectacles, especially night vision spectacles (10), include a camera (26), integrated into the spectacles, as the primary recording device for the user of the spectacles (10). The camera has a special camera lens and a CCD sensor or a CMOS sensor. An image processing unit (48) mounted downstream of the camera (26) processes the image taken by the camera (26) and provides an output for display means (28, 30) which are associated with each eye for displaying the image. A reproduction lens system (32, 34) is mounted downstream of each display means (28, 30). At least one transmission and/or reception interface (64,66) is connected to an additional camera (126), separate from the spectacles (10), by signals. The image signals of the additional camera (126) are available via the interface (64, 66) to the display means (28, 30) for displaying the image of the additional camera (126).

26 Claims, 7 Drawing Sheets

U.S. PATENT DOCUMENTS

| | | | |
|---|---|---|---|
| 5,359,675 A | 10/1994 | Siwoff | |
| 6,008,779 A | 12/1999 | Ellis | |
| 6,046,712 A | 4/2000 | Beller et al. | |
| 6,091,546 A | 7/2000 | Spitzer | |
| 6,349,001 B1 | 2/2002 | Spitzer | |
| 7,211,778 B1 * | 5/2007 | Smith et al. | 250/207 |
| 7,576,919 B2 | 8/2009 | Durner et al. | 359/630 |
| 2002/0080094 A1 | 6/2002 | Biocca | |
| 2002/0101568 A1 | 8/2002 | Eberl et al. | |
| 2002/0163486 A1 | 11/2002 | Ronzani et al. | |

FOREIGN PATENT DOCUMENTS

| | | |
|---|---|---|
| DE | 19724140 C2 | 12/1998 |
| EP | 0592318 A | 4/1994 |
| EP | 0691559 A | 1/1996 |
| EP | 1273958 A | 1/2003 |
| EP | 1300716 A | 4/2003 |
| EP | 1300716 A1 | 4/2003 |
| EP | 1326120 A | 7/2003 |
| WO | 8504961 | 11/1985 |
| WO | 97/09652 A | 3/1997 |
| WO | 02/059654 A2 | 8/2002 |
| WO | 02/077670 A | 10/2002 |
| WO | 2005/054925 | 3/2005 |
| WO | 2005/054925 ISR | 3/2005 |
| WO | 2005054925 | 6/2005 |
| WO | 2005/054925 IPER | 9/2005 |

OTHER PUBLICATIONS

PCT/EP2006/005069 IPRP, Oct. 4, 2007, Durner.
U.S. Appl. No. 10/581,406, filed Apr. 19, 2007, Durner.
Reichlen, B. A.—Institute of Electrical and Electronics Engineers: Sparcchair: A one Hundred Million Pixel Display Sep. 18, 1993, Proceedings of the Virtual Reality Annual International Symposium, Seattle, Sep. 18-22, 1993. New York, IEEE, US, pp. 300-307, XP000457701 SEITE 304, 305; ABSATZ 2.5: "x Window System Modifications".

* cited by examiner

ELECTRONIC DAY AND NIGHT VISION GOGGLES HAVING DUAL CAMERA

The invention pertains to electronic day and night vision goggles.

There is an increasing need for electronic goggles, especially night-vision goggles, for police surveillance purposes, for military operations, and also for sports and leisure-time activities. Such goggles should be easy to use and light in weight, and it should be possible to use them even when the intensity of the light in the area to be observed changes significantly. With the help of night-vision goggles, it should be possible to carry out activities at night with the same ease as during the day without the use of additional sources of light.

Day vision eyeglasses are known from U.S. Pat. No. 6,349,001 B1, in which data can be superimposed onto the visual field of the eyeglasses. These are normal eyeglasses with normal eyeglass lenses, but the eyeglass lenses are also designed to function as a display. A camera is built into the eyeglass frame so that pictures can be taken without anyone else knowing.

US 2002 01 63 486 A1 describes display goggles which have a small screen with an eyepiece lens for each eye. The screens display images from an external data source.

US 2002 01 01 568 A1 discloses an information system with goggles, which track the movement of the eyes and correlate those movements with other data.

U.S. Pat. No. 5,200,827 B discloses a display system, which is integrated into either a helmet or into goggles. External data can be superimposed and displayed by the display system.

EP 1 300 716 A1 also discloses a display system, which is mounted above the normal viewing area. The user must constantly refocus his eyes when switching from observing the normal viewing area to observing the information on the display.

One type of night-vision goggles is known from DE 38 06 940 A1, for example. In the case of these night-vision goggles, low light levels in the form of moonlight or starlight are amplified by an image converter. These night-vision goggles comprise, for each eye, an objective lens system, an image converter, and a display means. Each of the display means is provided with a lens system, through which the image is seen. The image converter consists essentially of a cathode-ray tube, which amplifies the rays of the low available light and sends these amplified rays to the display means, where they can be seen through an eyepiece lens system.

Night-vision goggles of this type suffer from the disadvantage that they require a high operating voltage. Taken together with the batteries and the cathode-ray tube, they are quite heavy. In addition, the quality of the image is quite limited. Details cannot be recognized. Their range of application, furthermore, is highly restricted because of their low sensitivity, being capable of operating without supplemental lighting only to a low-light level of 0.001 lux, which corresponds to an available light amplification of 30,000-40,000. There is also the additional problem that when a floodlight is turned on, for example, the sudden change in brightness blinds the user of the goggles and renders him incapable of carrying out the intended activity.

A generic type of electronic goggles, especially night-vision goggles, is also known from DE 197 24 140 C2. These goggles comprise an electronic image-recording camera with an objective lens system and a CCD sensor. These electronic goggles also have an image-processing unit, which processes the image recorded by the image-recording camera and, to reproduce the image, sends an output signal to a display means assigned to each eye, each of these display means being provided with an eyepiece lens. These goggles, however, are always operated in conjunction with a source of infrared light to improve the night-vision properties of the night-vision goggles. For this purpose, the infrared light source is pulsed to achieve the highest possible efficiency at the lowest possible power consumption. A sensor is also provided, which controls the intensity of the infrared source as a function of the intensity of the available light.

This embodiment suffers from the relatively high power consumption, which leads to the need for large, heavy batteries or to short duty cycles. Another disadvantage, one which occurs especially when the goggles are used in military deployments at night, is that the user of these night-vision goggles can be easily detected by an enemy using appropriate goggles which are sensitive to infrared light. The user thus becomes an easy target and is put in great danger.

All of the known goggles, furthermore, suffer from the problem that the observed environment is not presented accurately. Goggles of this type therefore make it very difficult for the user to orient himself and to move at night across the terrain. The known electronic goggles do not make it possible to estimate distances accurately or to see in three dimensions; at best, their capacities in these respects are extremely limited.

The applicant has filed the not previously published application PCT/EP2004/013581, according to which the camera, the display means, and the eyepiece lens are designed to work together in such a way that the displayed dimensions of the image which the user detects during use correspond to the real relationships which the user would see in a direct view without restriction. As a result, a person wearing the goggles can execute even complicated activities, because the image which he sees corresponds to the real dimensions and relationships of the objects. In addition, the effect of at least a virtual 3D image is created, so that it becomes easier for the user to orient himself and to estimate distances.

The visual field, however, is limited by the image-recording capacities of the image-recording camera. There is an increasing need, however, to make additional spaces viewable, such as the space in the rear and also certain remote locations. This additional data serves primarily to increase the safety of the user, such as a soldier in a battle situation, or to help the user make decisions about how to proceed further.

The invention is therefore based on the task of improving electronic goggles in such a way that, under avoidance of the disadvantages mentioned above, additional possibilities of observation and use by day and by night can be made available for many different areas of application.

SUMMARY OF THE INVENTION

According to the invention, the electronic goggles of the general type in question are provided at least with a transmitting and/or receiving interface, which is connected to another camera, separate from the goggles, by means of signaling technology. This other camera is provided with a digital image sensor, especially a CCD or CMOS sensor, and, via the interface, the image signals of this second camera are made available to the display means for displaying the image of the second camera. The signal-transmitting technology can involve the use of a cable, or it can involve wireless transmission, as will be described further below.

A first selector switch is preferably provided, by means of which the image signals of either the image-recording camera and/or the second camera, as desired, can be made available to the display means to display the image. The first selector switch can be designed to be actuated either manually or automatically, and it can also be present exclusively on the second camera. The user is thus given the freedom to decide which image data he wants to appear on the display means— i.e., the image data from the first camera or the image data from the second camera. On the other hand, if one of the cameras has been activated by priority circuit, the image data of that camera will appear on the display means.

According to one embodiment of the invention, the second camera has first transmitting and receiving means, and the interface has second transmitting and receiving means for the wireless transmission of signals between the second camera and the goggles.

So that, when the user of the electronic goggles is looking forward, he can also check the space in the rear, means are provided specifically for fastening the second camera to the body of the user. As a result, it is possible, for example, for the second camera to be fastened to the user's helmet so that it faces toward the rear, and the user can then observe the space ahead by means of the image-recording camera and also the space behind him by means of the second camera.

The image signals of the image-recording camera and/or of the second camera are preferably sent via an electronic video signal detector with a recognition device, namely, a detector which automatically recognizes the type of signal being fed to it and offers it to the image-processing unit of the image-recording camera, to the image-processing unit of the second camera, and to the display units.

It can be necessary, for example, for the image signals to be sent to the display means whenever the second camera or the image-recording camera is delivering signals. A priority circuit is provided for this purpose. It is also conceivable that the second camera could work together with a sensor, which activates the second camera. If this is the case, the image signals can be offered automatically, provided that the first selector switch has been set to the appropriate position.

In particular, the camera is also provided for this purpose with an activation switch, which is connected by signal-transmitting technology to a sensor, such as a motion sensor, and which activates the second camera when the sensor responds. If, for example, someone moves in the space to the rear, which is also to be observed, the second camera will be activated and, if the selector switch has been set to the appropriate position, the image data will be offered.

According to another embodiment of the invention, the second camera is provided with an image-processing unit, by means of which the image which can be detected by the user during use is presented in real time. Downline from the digital image sensor, a digital filter, and a following digital/analog converter, the image signal is handled by essentially analog technology as an analog image signal until final processing in the display. This embodiment is based on the realization that analog image signal transmission and analog technology are considerably faster than digital with respect to the bandwidth of the signal to be transmitted. As a result, the image can reach the user in real time without any propagation delay or phase shift; that is, the observer will perceives no difference with respect to the real image.

The lens system of the image-recording camera, the display means, and the eyepiece lens system in particular are coordinated with each other, furthermore, in such a way that the displayed dimensions of the image which the user detects during use correspond in a 1-to-1 manner to the real relationships which the user would see in a direct view without restriction.

The image-recording camera and its image-processing unit can be designed so that the image which the user can detect during use is displayed in real time. The approximation of reality is therefore perfect or nearly perfect not only as a result of the method used to display the image but also as a result of the speed with which the image is displayed.

When the user's eyes are in a certain base position, namely, a position corresponding to a straight-ahead view, the center axis of the display means, the optical axis of the eyepiece lens, and the associated axis of the user's eye are preferably aligned concentrically with each other. The use of this simple measure guarantees that the image corresponds to the actual size relationships.

So that vision defects can be compensated, the position of the eyepiece lens of the display means in question is designed to be adjustable along the optical axis relative to the display means. In particular, the eyepiece lens system of one display means is designed to be adjustable independently of the eyepiece lens system of the other display means. Because individual vision defects can thus be corrected, both eyes will see a sharply focused image.

To optimize 3D vision, two image-recording cameras and two image-processing units, which are synchronized with each other with respect to the various image-processing steps, are provided for each display means. The optical axes of the image-recording cameras are preferably concentric to the axes of the user's eyes in the base position. By the use of this simple measure, therefore, accurate 3D reproduction is achieved.

According to an embodiment of the invention, the display means are mounted in a fixed carrier and supported so that they can be shifted laterally to align with the axes of the user's eyes. The carrier in turn is mounted permanently in the goggle frame. As a result, the image is reproduced in correspondence with reality and in the appropriate size ratios and will not be distorted by displacement of the components with respect to each other within the overall arrangement.

The objective lens system and the image-processing unit are therefore also mounted in the carrier, so that the fixed carrier guarantees a predetermined interrelationship of all of the parts mounted on it.

Although the previously mentioned optical characteristics are advantageous in providing the most realistic possible display of the image, the following features, pertaining to the electronic circuitry, make it possible to improve the realism of the image display even more.

To obtain good image quality for night vision applications, the camera has a CCD sensor or a CMOS sensor for the night vision range with a sensitivity for wavelengths from 380, especially for wavelengths from 500, to 1200 nm. As a result, the range of potential applications is significantly expanded, especially to applications working in the high-infrared range.

According to an embodiment of the invention, the camera is designed to work at available light levels of less than 0.001 lux, especially at levels of 0.0002 lux, without the need for additional lighting.

To improve image quality, the CCD sensor or the CMOS sensor of the image-recording camera and/or of the second camera is provided in particular with an image resolution of at least 790×590.

Because the image quality of black-and-white displays is much higher, the display means is designed to display black-and-white images, especially to display images in 256 shades of gray.

Image quality can be improved even more by providing the image processing unit of the image-recording camera and/or of the second camera with a digitized preamp stage, which removes noise and interference from the signal coming from the image-recording camera or from the second camera, especially from signals in the high-infrared range, i.e., at wavelengths of 650-1200 nm.

The preamp stage can be followed by, for example, a digital/analog converter, so that the signal can then be subjected to further processing as an analog signal at the standard level of 1 V peak-to-peak (=standard video level).

To guarantee clean signal processing and readout of the image data, the image-processing unit of the image-recording camera and/or of the second camera preferably has two series-connected analog amplifier stages and a control voltage circuit, which calibrates the amplifier stages to zero (DC-Off) each time an image pixel is read out—in line-by-line fashion, for example—from the CCD sensor of the camera. The noise components are suppressed even more as a result.

The amplifier stages are provided with a signal amplification of more than 25 dB, especially of 52 dB, versus the standard level.

It is also advantageous for the amplifier stages to have an external circuit which is optimized with respect to design and scaling to handle the amplification and transmission of signals carrying black-and-white image data.

In particular, the amplifier stages are provided with a closed-loop controller for the range of 5-52 dB. When the brightness of the environment changes rapidly, this controller modulates the amplifiers in such a way that the image is not noticeably overexposed. In particular, the controller is designed to be activated manually.

This guarantees that unrestricted vision remains preserved under any lighting conditions. In certain areas of application, furthermore, it can be advantageous for the user to turn this controller off, so that he can detect when the lighting conditions change.

According to an embodiment of the invention, the amplifier stages are provided with a manually actuated open-loop controller, which the user can use to adjust the sensitivity of the amplifiers. In this way, the user can adjust the goggles to the lighting conditions and/or to the intended purpose.

The amplifier stages preferably contain a "sample-and-hold" circuit across a field-effect transistor to clamp the signal, which are time-controlled as a function the arriving signal to achieve high sensitivity and to ensure that the amplifier stages operate in harmony with each other.

To improve image quality, image noise and the false-color components are eliminated or at least suppressed by installing at least two active signal filters in the form of bandpass filters downline from the digital/analog converter.

In particular, a signal buffer stage with an amplification function, especially by more than two versus the standard level, is provided downline from the active signal filters, so that losses arising from the preceding signal processing and signal transmission steps can be compensated and equalized.

According to an embodiment of the invention, a bandpass filter and a signal splitter for impedance matching are connected upline of the display means to ensure loss-free matching to the following electronic display circuitry.

The signal splitter works together with a signal processing unit, which ensures that the images displayed by the display means are in phase and synchronized with each other.

The display means are preferably AMLCD screens or FLLCD screens.

The electronic goggles are connected to a voltage source, especially to a battery or storage battery, so that they can be used in any location.

The battery or storage battery is preferably accommodated in a battery housing, especially a separate housing, designed to be attached to the user's body by means of fastening devices.

According to an embodiment of the invention, the display means has an on-screen display (video superimposition) for showing additional information pertaining to the displayed image. For example, information on the user's assignment or on the recognized terrain, operating data of the electronic systems, user-specific data from external sources, and the like, can be superimposed on the main image.

In particular, a transmission and/or reception interface is also provided, by means of which the images visible to the user can be transmitted. The user's commanding officer, for example, could therefore receive the images at his command post and issue appropriate instructions in the form of an on-screen display to the user.

The design of the goggles is especially advantageous if, when they are used at night as intended, no visible or invisible light can be detected from the outside. This means that the user of the goggles can remain undetected even by infrared sensors and yet can still find his way safely in the dark.

So that the opacity to light can be easily realized, a goggle frame is provided with sealing means, which seal the goggles to the head of the user when they are being worn properly, so that no light can escape through gaps between the user's head and the goggles. The sealing means are preferably formed by replaceable pads.

So that the goggles can be adjusted quickly and easily to heads of different shapes, a set of different pads is available, which can be attached to the goggle frame as needed to suit the shape of the user's head.

Additional advantages, features, and possible applications of the present invention can be derived from the following description in conjunction with the exemplary embodiments illustrated in the drawing.

BRIEF DESCRIPTION OF THE DRAWINGS

The invention is described in greater detail below on the basis of exemplary embodiments shown in the drawing. The terms and associated reference symbols given in the attached list are used in the description, in the claims, in the abstract, and in the drawing. In the drawings:

DESCRIPTION OF THE INVENTION

Figure 1:
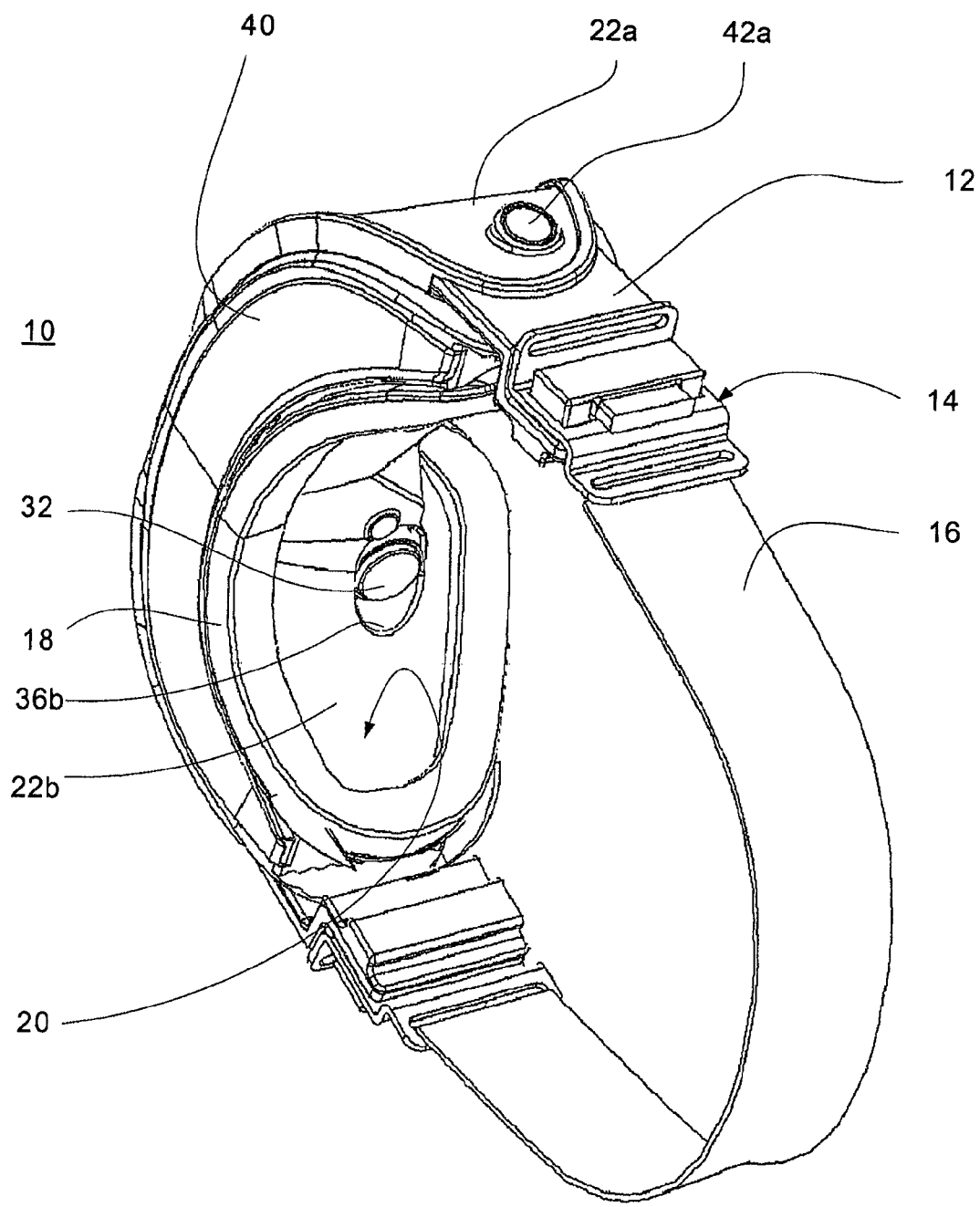
FIG. 1 shows rear view, in perspective, from slightly above and to the side, of a pair of day and night-vision goggles according to an embodiment of the invention.

FIGS. 1-4 show various views of on embodiment of a pair of day and night-vision goggles 10 according to the invention.

The day and night-vision goggles 10 consist of a goggle frame 12, which is held in place, via the closure 14, by a fastening belt 16. The goggle frame 12 is designed in the same way as the frames of safety goggles or ski goggles and has cushioning pads 18 on the side facing the head of the user. The pads 18 close off the day and night-vision goggles 10, when they are being used as intended, so tightly to the user's head that no visible or invisible light can be detected from the outside. As a result, the user of the day and night-vision goggles 10 can be remain undetected even by infrared sensors and yet can still find his way safely in the dark.

The pads 18 are designed to be detachable. So that the goggles can be adapted quickly and easily to accommodate users of the day and night-vision goggles 10 with heads of different shapes, a set of different pads 18 is available, which can be attached to the goggle frame in correspondence with the shape of the user's head. The day and night-vision goggles in their entirety, furthermore, are designed to be opaque.

In the goggle frame 12, an insert 20 is installed, which, on the side facing away from the head of the user, is covered by a protective wall 22a and on the side facing the user's head by a protective wall 22b. The insert 20 is permanently attached to the goggle frame 12.

Figure 3:
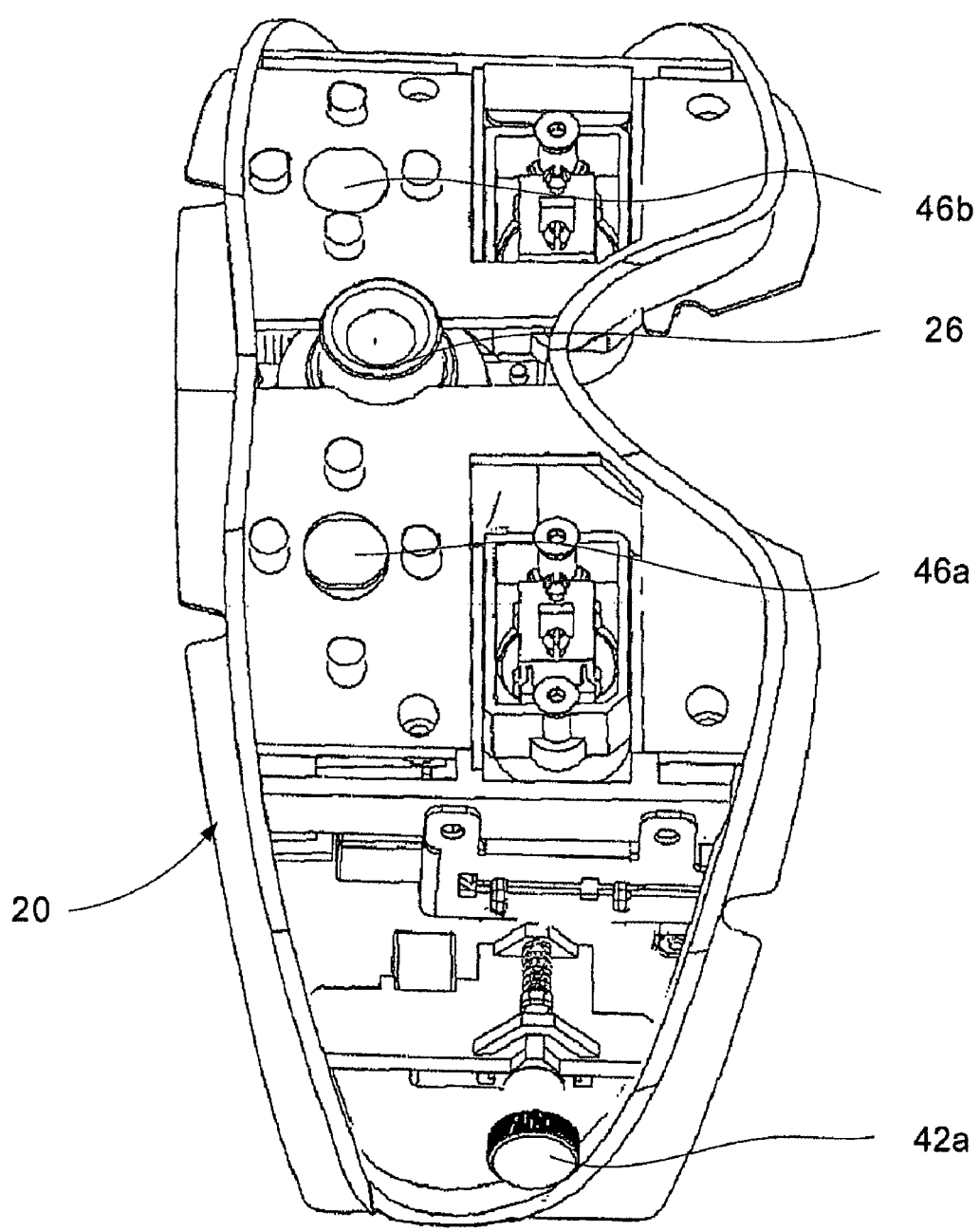
FIG. 3 shows a view, in perspective, of the use of the day and night-vision goggles of FIG. 2 but without the outside wall.
Figure 4:
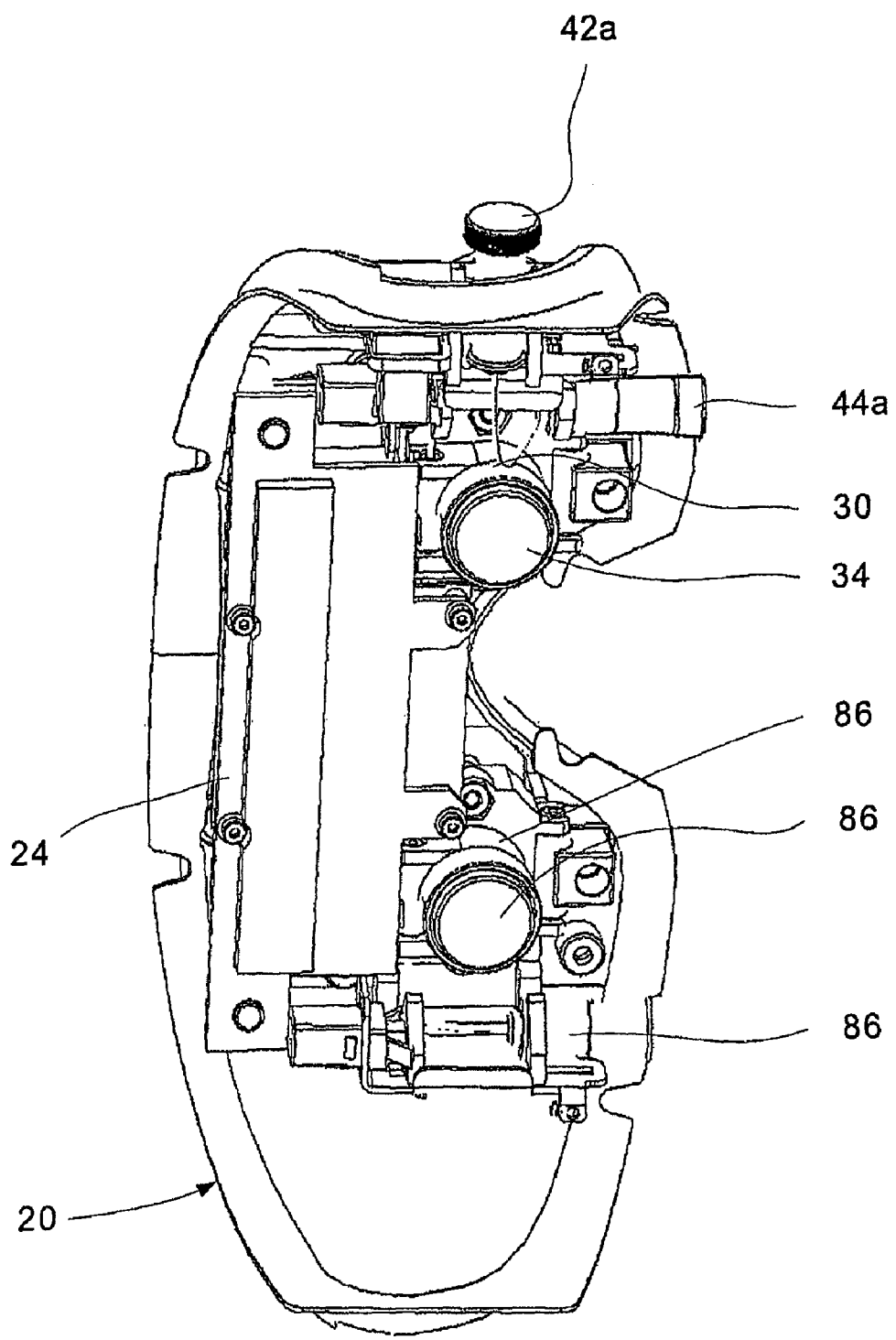
FIG. 4 shows a view, in perspective, of the use of the day and night-vision goggles of FIG. 1 but without the rear wall.

The insert 20 is shown in detail in FIGS. 3 and 4 and is provided with a support plate 24, to which all of the optical and electrical components are permanently attached.

An image-recording camera 26 and two displays 28—left—and 30—right—are mounted on the support plate 24. In addition, eyepiece lenses 32, 34, assigned to the displays 28, 30, respectively, are also mounted on the support plate 24.

Figure 2:
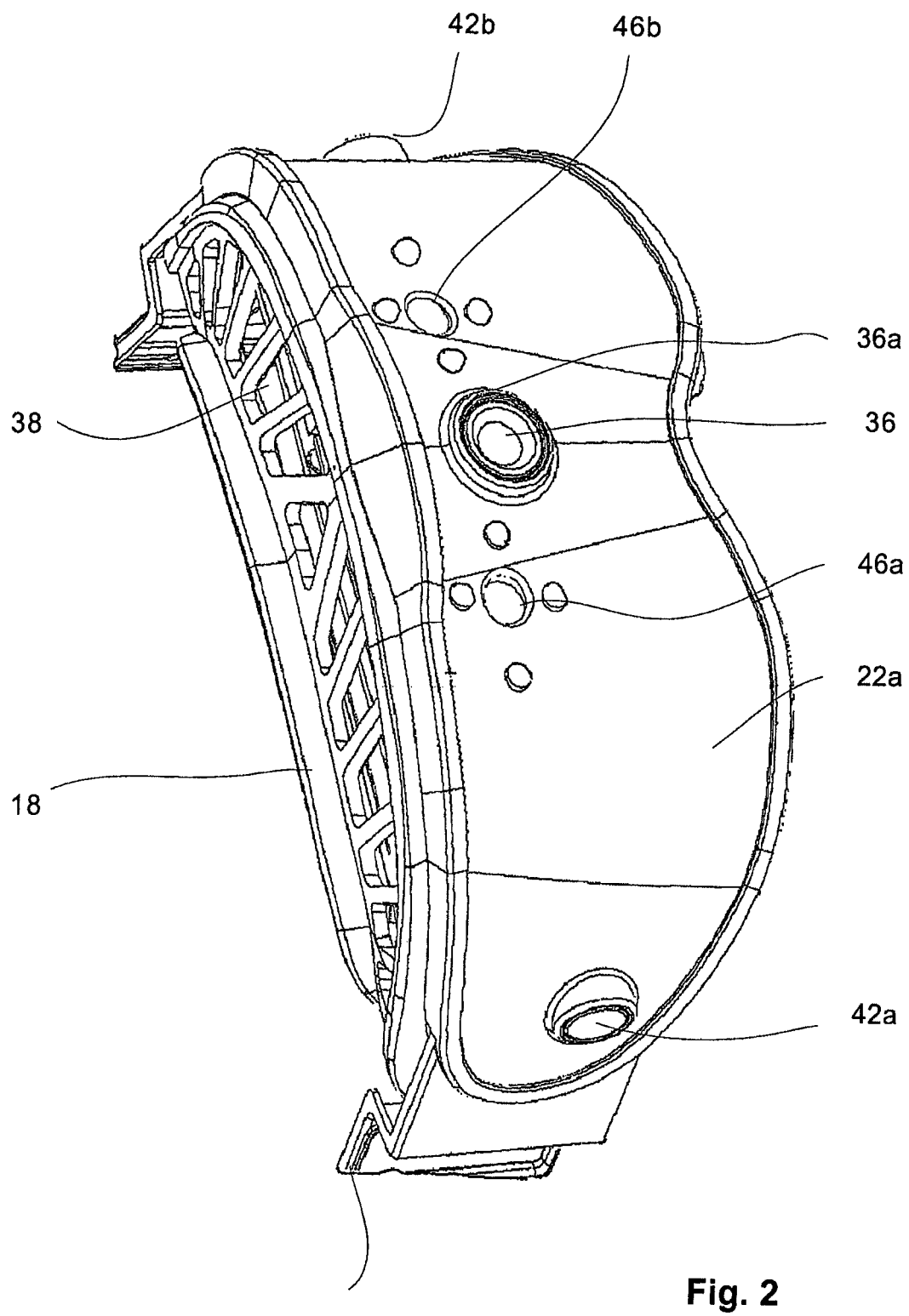
FIG. 2 shows a front view, in perspective, of the day and night-vision goggles of FIG. 1.

The protective wall 22b has openings 36b and 36c for the eyepiece lenses, and the protective wall 22a has openings 36a for the camera (see FIGS. 1 and 2).

On the top side of the goggle frame 12 are vent openings 38, which are covered by a permeable film 40. This guarantees that the heat generated by the electronic components can escape from the interior of the day and night-vision goggles 10 to the outside through the vent openings 38 and the permeable film 40.

Figure 5:
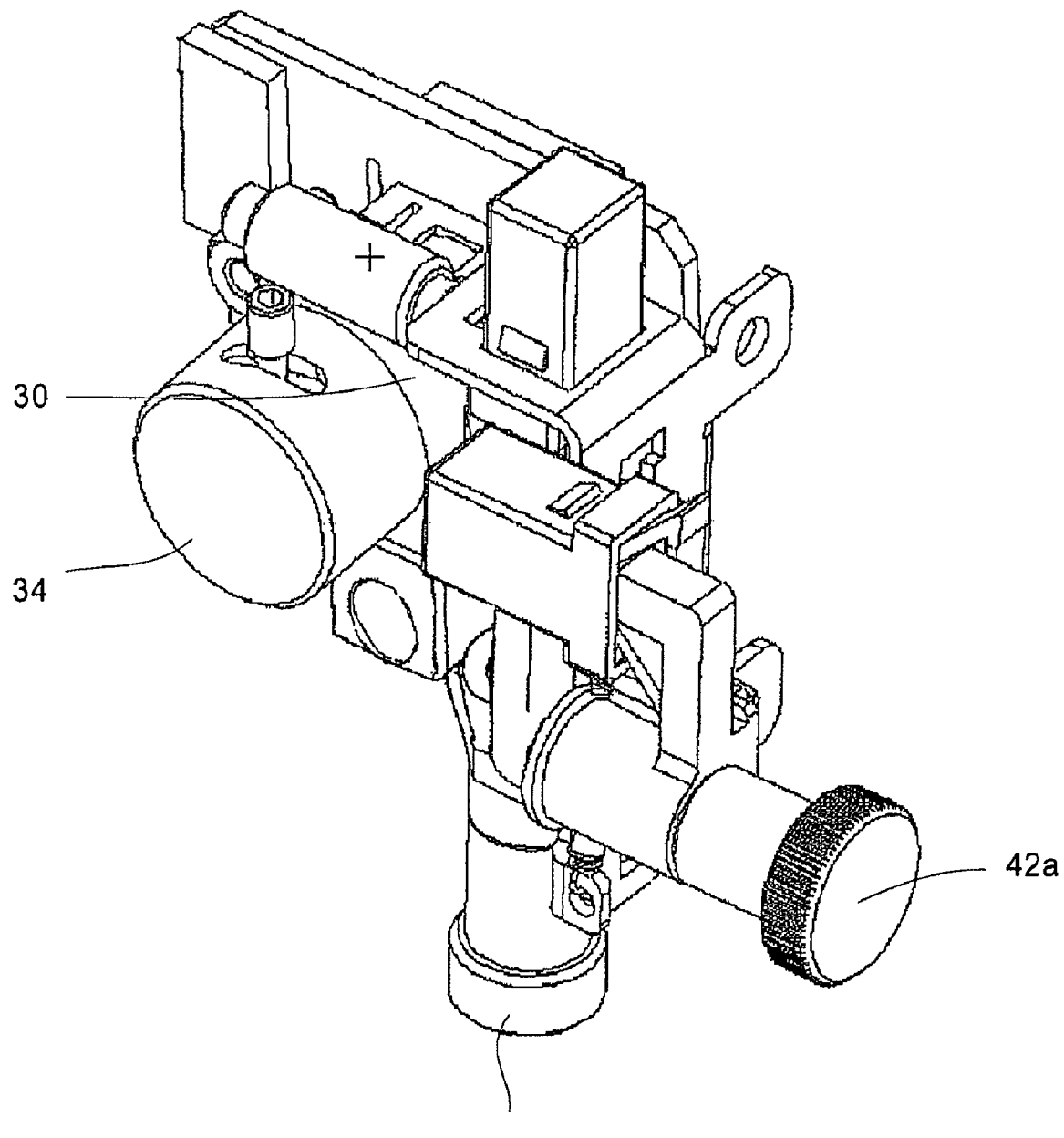
FIG. 5 shows a view, in perspective, of a detail of FIG. 4, to illustrate the adjustability of the eyepiece lens and of the display.
Figure 6:
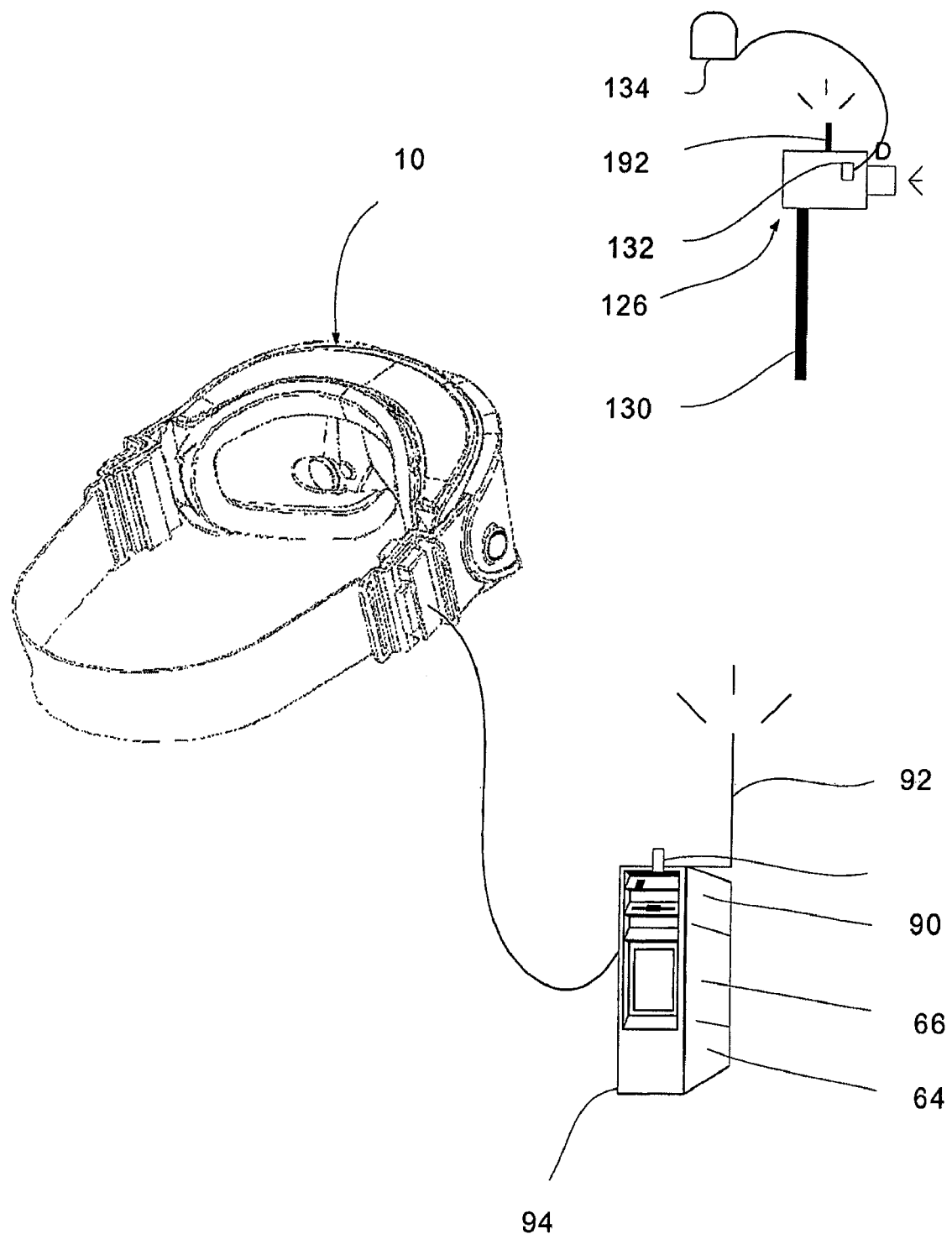
FIG. 6 shows a schematic diagram of the day and night-vision goggles with a second camera according to an embodiment of the invention.

The image-recording camera 26, the displays 28 and 30, and the eyepiece lenses 32, 34 are designed to work together in such a way that that the dimensions of the image which the user sees during use correspond to the real relationships which the user would see in a direct view without restriction. For this purpose, the eyepiece lens 32 is connected to the display 28 and the eyepiece lens 34 is connected to the display 30 in such a way that they can be shifted laterally with respect to each other in the support plate 24. By making use of the lateral displacement capacity, the interocular distance, which can differ from one user to another, can be adjusted so that, when the user's eyes are in a certain base position, namely, a position in which the user is looking straight ahead, the center axis of the displays 28, 30, the optical axes of the eyepiece lenses 32, 34, and the associated ocular axes of the user are concentric to each other—see also FIG. 5. For this purpose, adjusting devices 42a, 42b are provided on each side of the insert 20 of the day and night-vision goggles 10. So that, in addition, vision defects of the individual eyes of the user can also be compensated, additional adjusting devices 44a, 44b for the corresponding eyepiece lenses 32, 34 are provided, which can be used to shift the eyepiece lenses 32, 34 along their optical axes relative to the displays 28, 30. An individual eyepiece lens 32, 34 can be adjusted by the use of one of the additional adjusting devices 44a, 44b independently of the eyepiece lens 34, 32 of the other display 30, 28.

The night-vision goggles 10 also have available light sensors 46a, 46b, which work together with an automatic control unit. This will be explained further below in conjunction with FIG. 7.

The day and night-vision goggles 10 have transmission and reception interfaces 64, 66, which are connected to a second camera 126, separate from the day and night-vision goggles 10. In the present case, the signals are transmitted essentially by radio—i.e., in wireless fashion, where the second camera 126 has a transmission interface 164 and a reception interface 166, which are connected to the first sending and receiving means 190, 192. The interfaces 64 and 66 of the day and night-vision goggles 10, which are integrated into a separate housing 94, are connected to second sending and receiving means 90, 92 for wireless transmission of signals between the second camera 126 and the day and night-vision goggles 10.

The second camera 126 is also provided with a digital image sensor, namely, with a CCD or CMOS sensor, where, via the interfaces 164, 166 and 66, 64, the image signals of the second camera 126 are made available to the display means 28, 30 of the day and night-vision goggles 10 for displaying the image of the second camera.

On the separate housing 94 of the day and night-vision goggles 10, a first selector switch 128 is mounted, by means of which the image signals of either the image-recording camera 26 and/or of the second camera 126 can be made available, as desired, to the display means 28, 30 for display of the image.

The separate housing 94 also contains batteries or storage batteries 62 and can be fastened to the user's belt.

The first selector switch 128 can be designed to be actuated either manually or automatically.

A plug 130 for fastening the second camera 126 to the belt or helmet of the user is provided.

The second camera 126 has an activation switch 132, which is to the motion sensor 134.

Figure 7:
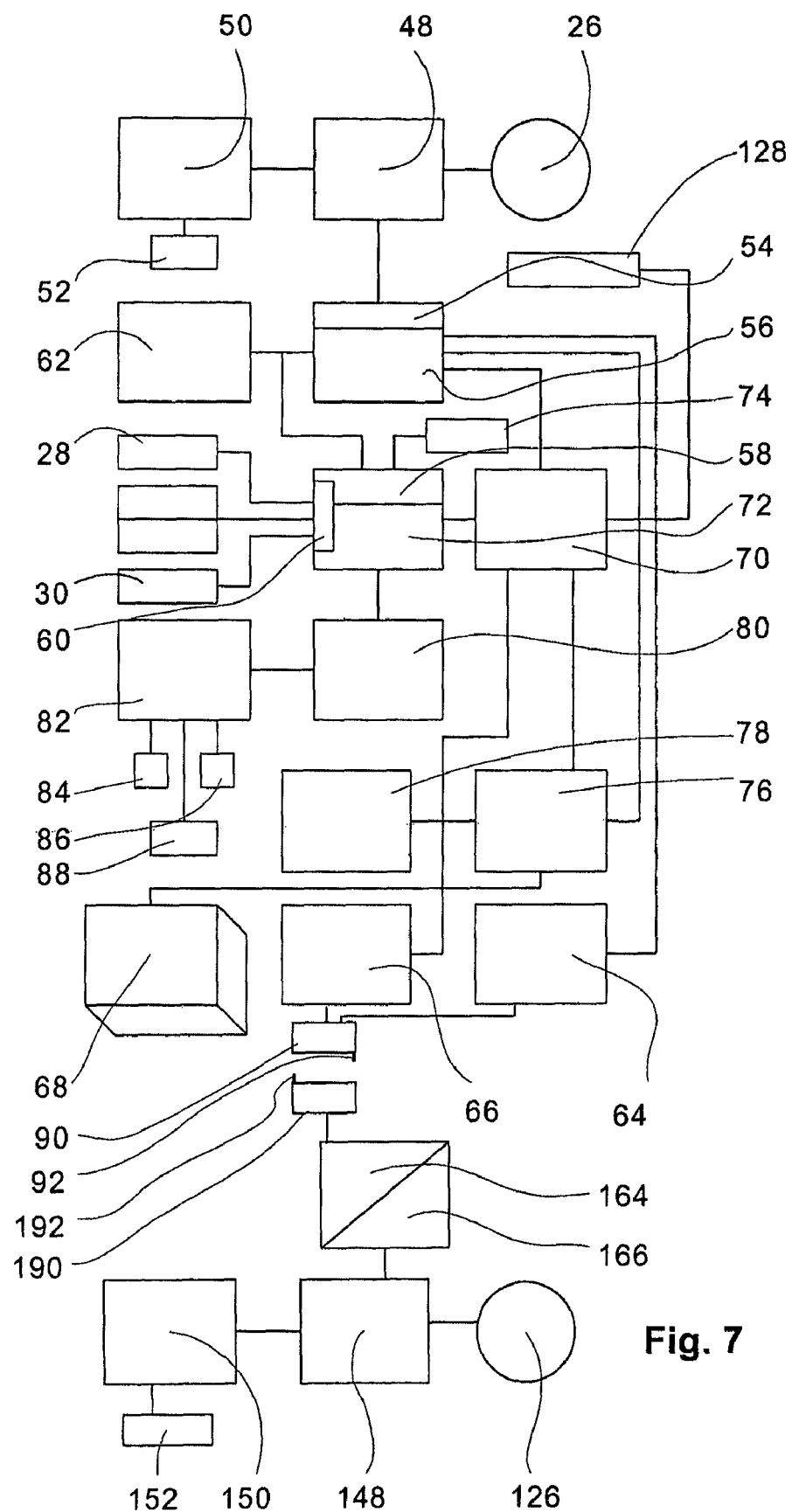
FIG. 7 shows a schematic circuit diagram, which shows how the signals are processed.

The second camera 126 is also provided with an image processing unit 148, by means of which the image which the user of the night-vision goggles can detect during use is displayed in real time—see FIG. 7. The second camera 126 has a CCD sensor or a CMOS sensor for the night vision range with a sensitivity for wavelengths of 500-1200 nm and is designed for available light levels of less than 0.001 lux, especially for 0.0002 lux, without the need for additional lighting. The CCD sensor or CMOS sensor also has an image resolution of at least 790×590.

The second camera 126 is provided with an objective lens system (not shown here in detail) with fixed or adjustable lenses.

The image-processing unit 148 works together with an amplifier control unit 150, which can be turned on and off by means of an operating element 152.

According to FIG. 7, the camera 26 works together with an image processing unit 48. The recording camera 26 and the image-processing unit 48 are designed so that the image which the user of the night-vision goggles can detect during use is displayed in real time. The recording camera 26 has a CCD sensor or a CMOS sensor for the night vision range with a sensitivity for wavelengths at 500-1200 nm and is designed for available light levels of less than 0.001 lux, especially for 0.0002 lux, without the need for additional lighting. The CCD sensor also has an image resolution of at least 790×590.

The recording camera 26 is provided with an objective lens system (not shown here in detail) with fixed or adjustable lenses.

The image-processing unit 48 works together with an amplifier control unit 50, which can be turned on and off by means of an operating element 52. The image-processing unit 48 is provided with a digitized preamp stage, which removes noise and interference from the signal coming from the recording camera 26, especially in the near and high-infrared range, i.e., in the range of wavelengths from 650 to 1200 nm. The preamp stage is a followed by a digital/analog converter, so that the signal can then be further processed as an analog signal at the standard level of 1 V peak-to-peak (=PAL level). The signal then passes through two series-connected analog amplifier stages in the image-processing unit 48. To ensure clean signal processing and readout, the amplifier stages have a voltage control circuit, which calibrates the amplifier stages to zero each time an image pixel is read out—on a line-by-line basis, for example—from the CCD sensor of the image-recording camera 26. Noise is also suppressed. The amplifier stages are provided with a signal amplification of more than 25 dB, preferably of 52 dB, versus the standard level.

The amplifier stages are provided with an external circuit, which, with respect to its design and scaling, is optimized for the amplification and transmission of signals containing black-and-white image data. A closed-loop controller for the range of 5-52 dB is assigned to the amplifier stages. This controller acts together with the available light sensors 46a, 46b in such a way that the amplifier stages are adjusted in correspondence with the intensity of the available light. The quality of the image which the user sees thus remains independent of the available light conditions.

The amplifier stages contain a "sample-and-hold" circuit built around a field-effect transistor to clamp the signal, which are time-controlled as a function of the arriving signal to guarantee high sensitivity and to ensure that the amplifier stages work in harmony with each other. At least two active signal filters in the form of a bandpass filter 54 are connected downline from the image-processing unit 48 and thus also downline from the digital/analog converter of the image-processing unit 48. These filters improve the image quality by suppressing, at least, or even completely eliminating image noise and false-color components. A signal buffer stage 56 with an amplification function, especially by more than two versus the standard level, is connected downline from the active signal filters 54, so that losses from the preceding signal processing and signal transmission steps are compensated and equalized.

Another bandpass filter 58 and a signal splitter 60 for impedance matching are connected upline of the displays 28 and 30 to ensure loss-free matching to the following electronic display circuitry. The signal splitter 60 cooperates with a signal processing function, which ensures that the images in the displays 28, 30 are in phase and synchronized with each other.

The displays 28, 30 can be AMLCD or FLLCD screens based on liquid-crystal technology or ferrolyte technology, optimized for displaying images in black and white.

The night-vision goggles 10 are connected to a voltage source, namely, to a battery 62. The battery 62 is accommodated in a separate battery housing, which can be fastened to the body of the user. Battery housings of this type are known, and there is therefore no need to describe them in detail here.

The night-vision goggles 10 are provided with a transmission interface 64, a reception interface 66, and a serial interface 68. For inputs and outputs, the transmission interface 64 cooperates with the signal buffer stage 56, and the reception interface 66 cooperates with another signal buffer stage 70.

The image signals of the recording camera 26 and of the second camera 126 are sent by way of an electronic video signal detector with a recognition device, which is integrated into the signal buffer stage 56 and which automatically recognizes the type of signal which is being supplied and offers it to the image-processing unit 48 of the recording camera 26, the image-processing unit 148 of the second camera 126, and the display units 28, 30.

This signal buffer stage 70 cooperates with a video driver 72, which includes the bandpass filter 58. An operating element 74 can be used to adjust the contrast and the brightness of the display by way of the video driver.

The data for an OSD display can be superimposed onto screens 28 and 30 via the serial interface 68. For this purpose, the serial interface 68 works together with an OSD text generator 76. By way of a card reader 78, the user is identified and the OSD data for the assigned user are selected accordingly. In addition, an OSD data generator 80 for superimposing internal data can also be provided; this generator cooperates with a corresponding measurement data acquisition unit and the corresponding sensors 84, 86, 88. In this case, the sensors can include a sensor for the battery voltage, a light sensor, a gas sensor, a time display, etc.

The sensor 84 used to monitor the battery can actuate two LEDs, one of which monitors operation with brightness control, the other serving as an overvoltage detector, which gives a warning signal. Optionally, an acoustic warning buzzer can also be provided. The serial interface 68 can work together with a GPS system, with a wireless LAN system, etc.

The day and night-vision goggles 10 with the second camera 126 according to the invention increase the ability to see in darkness. The invention is characterized by its simple design and its realistic and expanded display of the image of the area being observed.

LIST OF REFERENCE NUMBERS

10 day and night-vision goggles
12 goggle frame
14 closure
16 fastening belt
18 pads
20 insert
22a protective wall, front
22b protective wall, rear
24 carrier plate
26 image-recording camera
28 display—left
30 display—right
32 eyepiece lens—left
34 eyepiece lens—right
36a opening for the recording camera
36b opening for the eyepiece lens—left
36c opening for the eyepiece lens—right
38 vent openings
40 permeable film
42a adjusting device—right
42b adjusting device—left
44a additional adjusting device—right
44b additional adjusting device—left
46a available light sensor—right
46b available light sensor—left
48 image-processing unit
50 amplifier control
52 operating element
54 bandpass filter
56 signal buffer stage
58 bandpass filter and video driver
60 signal splitter
62 battery
64 transmission interface 66 reception interface
68 serial data interface
70 additional signal buffer for inputs and outputs
72 video driver and signal filter
74 operating element
76 OSD text generator
78 card reader
80 OSD data generator
82 measurement data acquisition
84 sensor
86 sensor
88 sensor
90 sending and receiving means
92 antenna for sending and receiving means
94 separate housing
126 second camera
128 selector switch
130 plug
132 activation switch
134 motion sensor
148 image-processing unit
150 amplifier control
152 operating element
164 transmission interface
166 reception interface
190 sending and receiving means
192 antenna for sending and receiving means

The invention claimed is:

1. Electronic day and night-vision goggles (10), comprising:
  an electronic image-recording camera (26) integrated into said goggles as the primary image-recording means, said camera being provided with an objective lens and a digital image sensor;
  an image-processing unit (48) connected downline from said image-recording camera (26) electronically processes the image recorded by said image-recording camera (26);
  a display means (28, 30) assigned to each eye of a human for display of said image;
  said image-processing unit communicating with said display means;
  an eyepiece lens (32, 34) connected downline from each display means (28, 30),
  at least one transmission and/or reception interface (64, 66) connected to a second camera (126) separate from said goggles (10) by means of signal-transmission technology; and,
  said second camera includes a digital image sensor and image signals of said second camera (126) are made available via the interface (64, 66) to said display means (28, 30) for display of said image of said second camera (126).

2. Electronic day and night-vision goggles (10) as claimed in claim 1 wherein said digital image sensor is a CCD sensor or a CMOS sensor.

3. Electronic goggles according to claim 1, wherein said image signals of said image recording camera and/or of said second camera (126) can be made available to the display means (28, 30) for display of said image with a first selector switch (128).

4. Electronic goggles according to claim 3, wherein said first selector switch (128) can be actuated either manually or automatically.

5. Electronic goggles according to claim 3, wherein said first selector switch (128) is mounted on said second camera (126).

6. Electronic goggles according to claim 1 wherein said second camera (126) has first sending and receiving means (190, 192) and said interface has second sending and receiving means (90, 92) for wireless transmission of signals between said second camera (126) and said goggles (10).

7. Electronic goggles according to claim 1 wherein said second camera (126) has fastening means for attachment to the body of the user.

8. Electronic goggles according to claim 1 wherein said image signals of said image-recording camera (26) and/or of said second camera (126) are sent through an electronic video signal detector (56) with a recognition device, said recognition device automatically recognizes the type of signal being supplied and sends the signal to said image-processing unit (48) of the image-recording camera (26), to an image-processing unit (148) of the second camera (126), and to said display units (28, 30).

9. Electronic goggles according to claim 1, wherein said second camera (126) has an activation switch (132) connected to a sensor (134).

10. Electronic goggles according to claim 1, wherein said second camera (126) has an image-processing unit, wherein said image detected is displayed in real time, downline from the digital image sensor, a digital filter, and a digital/analog converter, and said image signal is an analog image signal until final processing in said display.

11. Electronic goggles according to claim 1, wherein said lens system of the image-recording camera (26), said display means (28, 30), and said eyepiece lens system work together wherein the dimensions of the displayed image detected correspond 1-to-1 to the actual dimensions.

12. Electronic goggles according to claim 1, wherein said image-recording camera (26) and said image-processing unit (48) display said image detected in real time.

13. Electronic goggles according to claim 1, wherein, the center axis of said display means (28, 30), the optical axis of said eyepiece lens (32, 34), and the associated axis of the user's eye are aligned concentrically with each other.

14. Electronic goggles according to claim 1, wherein, said eyepiece lens (32, 34) of a first display means (28, 30) is adjustable along the optical axis relative to said first display means (28, 30) and, further, said eyepiece lens is adjustable independent of said eyepiece lens (32, 34) of said a second display means.

15. Electronic goggles according to claim 1, wherein each of said display means (28, 30) includes two image-recording cameras (26) and two image-processing units (48), wherein the processing steps of said image-recording cameras (26) and said image-processing units (48) are synchronized with each other.

16. Electronic goggles according to claim 15, wherein said optical axes of the image-recording camera (26) are concentric with the ocular axes of the user's base position.

17. Electronic goggles according to claim 1, wherein said display means (28, 30) are mounted in a fixed carrier (24) and are supported to shift laterally in said carrier (24) with respect to the orientation of the ocular axes, when said carrier (24) is fixed in place in the goggle frame (12).

18. Electronic goggles according to claim 17, wherein said objective lens and said image-processing unit (48) are mounted in the carrier (24) in such a way that said fixed carrier (24) ensures that all of the parts mounted on said carrier (24) are in a predetermined relationship to each other.

19. Electronic goggles according to claim 1, wherein said image-recording camera (26) and/or said second camera (126) has a CCD sensor or a CMOS sensor for night-vision range with increased sensitivity for wavelengths from 380 nm to 1200 nm.

20. Electronic goggles according to claim 1, wherein said digital image sensor is a CCD sensor or a CMOS sensor and said image-recording camera (26) and/or said second camera (126) has an image resolution of at least 790 by 590 pixels.

21. Electronic goggles according to claim 1, wherein said image-processing unit of said image-recording camera (26) and/or of said second camera (126) has a digitized preamp stage, and said digitized preamp stage removes noise and interference, in the near-infrared range with wavelengths of 650-1200 nm, from the signal coming from the image-recording camera (26) and/or from said second camera (126).

22. Electronic goggles according to claim 21, wherein said preamp stage is followed by a digital/analog converter (DAC), said signal is processed as an analog signal at the standard level of 1V peak-to-peak.

23. Electronic goggles according to claim 1, wherein said image-processing unit (48) of said image-recording camera (26) and/or of said second camera (126) includes two series-connected analog amplifier stages, and a control voltage circuit; said digital image sensor is a CCD sensor or a CMOS sensor, said control voltage circuit calibrates the amplifier stages to zero each time an image pixel is read out on a line-by-line basis from said digital image sensor of said image-recording camera (26) and/or of said second camera to process clean signals and readout and suppress noise.

24. Electronic goggles according to claim 23 wherein said amplifier stages have an external circuit, and, said external circuit amplifies and transmits signals containing image data in the black/white range.

25. Electronic goggles according to claim 24, wherein said amplifier stages have a "sample-and-hold" circuit across a field-effect transistor to clamp said signal, and, said circuits are time-controlled as a function of the arriving signal to achieve high sensitivity and to ensure that the amplifier stages work in harmony with each other.

26. Electronic goggles according to claim 21, characterized by a goggle frame (12) with sealing means which closes off the goggles in such a way that no light can escape to the outside through gaps between the user's head and the goggles (10) when said goggles are in use.

* * * * *